(12) United States Patent
Mamei et al.

(10) Patent No.: US 9,494,167 B2
(45) Date of Patent: Nov. 15, 2016

(54) HYDRAULIC APPARATUS

(75) Inventors: Enrico Mamei, Modena (IT); Eronne Mamei, Modena (IT); Omer Mamei, Cognento (IT)

(73) Assignee: Safim S.p.A, Modena (IT)

( * ) Notice: Subject to any disclaimer, the term of this patent is extended or adjusted under 35 U.S.C. 154(b) by 1257 days.

(21) Appl. No.: 12/450,241

(22) PCT Filed: Mar. 13, 2008

(86) PCT No.: PCT/IB2008/000576
§ 371 (c)(1),
(2), (4) Date: Sep. 18, 2009

(87) PCT Pub. No.: WO2008/114109
PCT Pub. Date: Sep. 25, 2008

(65) Prior Publication Data
US 2010/0071543 A1    Mar. 25, 2010

(30) Foreign Application Priority Data
Mar. 20, 2007   (IT) .............................. MO2007A0097

(51) Int. Cl.
*B62D 5/30*   (2006.01)
*F15B 1/02*   (2006.01)
(Continued)

(52) U.S. Cl.
CPC ............. *F15B 1/022* (2013.01); *B62D 5/30* (2013.01); *E02F 9/225* (2013.01); *E02F 9/226* (2013.01); *E02F 9/2217* (2013.01); *E02F 9/2267* (2013.01); *F15B 20/005* (2013.01);
(Continued)

(58) Field of Classification Search
CPC ............. F15B 2211/8752; F15B 2211/20523; F15B 2211/20553; F15B 2211/212; F15B 2211/6052; F15B 2211/625; F15B 2211/863; F15B 20/005; F15B 1/002; E02F 9/2217; E02F 9/225; E02F 9/226; E02F 9/2267
USPC ................. 60/403, 413, 421, 422, 404, 405; 91/509, 519, 518
See application file for complete search history.

(56) References Cited

U.S. PATENT DOCUMENTS 1,932,761 A * 10/1933 West .............................. 409/248
2,614,644 A * 10/1952 Gustafson ..................... 180/420
(Continued)

FOREIGN PATENT DOCUMENTS

DE   3823892   *  1/1990
DE   4108915   *  9/1992

OTHER PUBLICATIONS

DE4108915—Machine translation to English of the Description.*
DE3823892—Machine translation to English of the Description.*
International Search Report.

*Primary Examiner* — Michael Leslie
*Assistant Examiner* — Michael Quandt
(74) *Attorney, Agent, or Firm* — Collard & Roe, P.C.

(57) ABSTRACT

The hydraulic apparatus includes: at least a pumping device for pumping a fluid at a first pressure; at least a user device of the fluid at the first pressure; at least an emergency supply device connectable to the user device activating a connection; at least an activation device of the connection that can be operated at a second pressure of the fluid different from the first pressure and interposed between the user device and the emergency supply device, the activation device having an emergency configuration wherein both the pumping device and the emergency supply device are connected to the user device.

9 Claims, 11 Drawing Sheets

(51) Int. Cl.
   *E02F 9/22* (2006.01)
   *F15B 20/00* (2006.01)
(52) U.S. Cl.
   CPC ............... *F15B2211/20523* (2013.01); *F15B 2211/20553* (2013.01); *F15B 2211/212* (2013.01); *F15B 2211/6052* (2013.01); *F15B 2211/625* (2013.01); *F15B 2211/863* (2013.01); *F15B 2211/8752* (2013.01)

(56) References Cited

U.S. PATENT DOCUMENTS

| | | | | |
|---|---|---|---|---|
| 3,078,673 A | * | 2/1963 | Browning et al. | 60/417 |
| 3,579,984 A | * | 5/1971 | Rohde | 60/384 |
| 3,651,642 A | | 3/1972 | Bauch et al. | |
| 3,882,952 A | * | 5/1975 | Crabb | 180/406 |
| 3,990,553 A | * | 11/1976 | Holzinger et al. | 192/3.57 |
| 4,068,678 A | * | 1/1978 | Lang | F15B 11/17 137/100 |
| 4,192,337 A | * | 3/1980 | Alderson et al. | 137/101 |
| 4,294,160 A | * | 10/1981 | Ideta et al. | 91/378 |
| 4,337,620 A | * | 7/1982 | Johnson | 60/418 |
| 4,422,290 A | | 12/1983 | Huffman | |
| 4,574,904 A | * | 3/1986 | Goode | 180/406 |
| 4,625,751 A | * | 12/1986 | Gage | 137/118.06 |
| 4,633,666 A | * | 1/1987 | Karakama | 60/421 |
| 5,052,179 A | | 10/1991 | Fujii | 60/421 |
| 5,127,227 A | * | 7/1992 | Ikari | 604/21 |
| 5,289,680 A | | 3/1994 | Obe et al. | |
| 6,332,316 B1 | * | 12/2001 | Morimoto et al. | 60/421 |
| 7,055,644 B2 | * | 6/2006 | Merz | 180/428 |
| 2007/0048146 A1 | | 3/2007 | Mamei et al. | |

\* cited by examiner

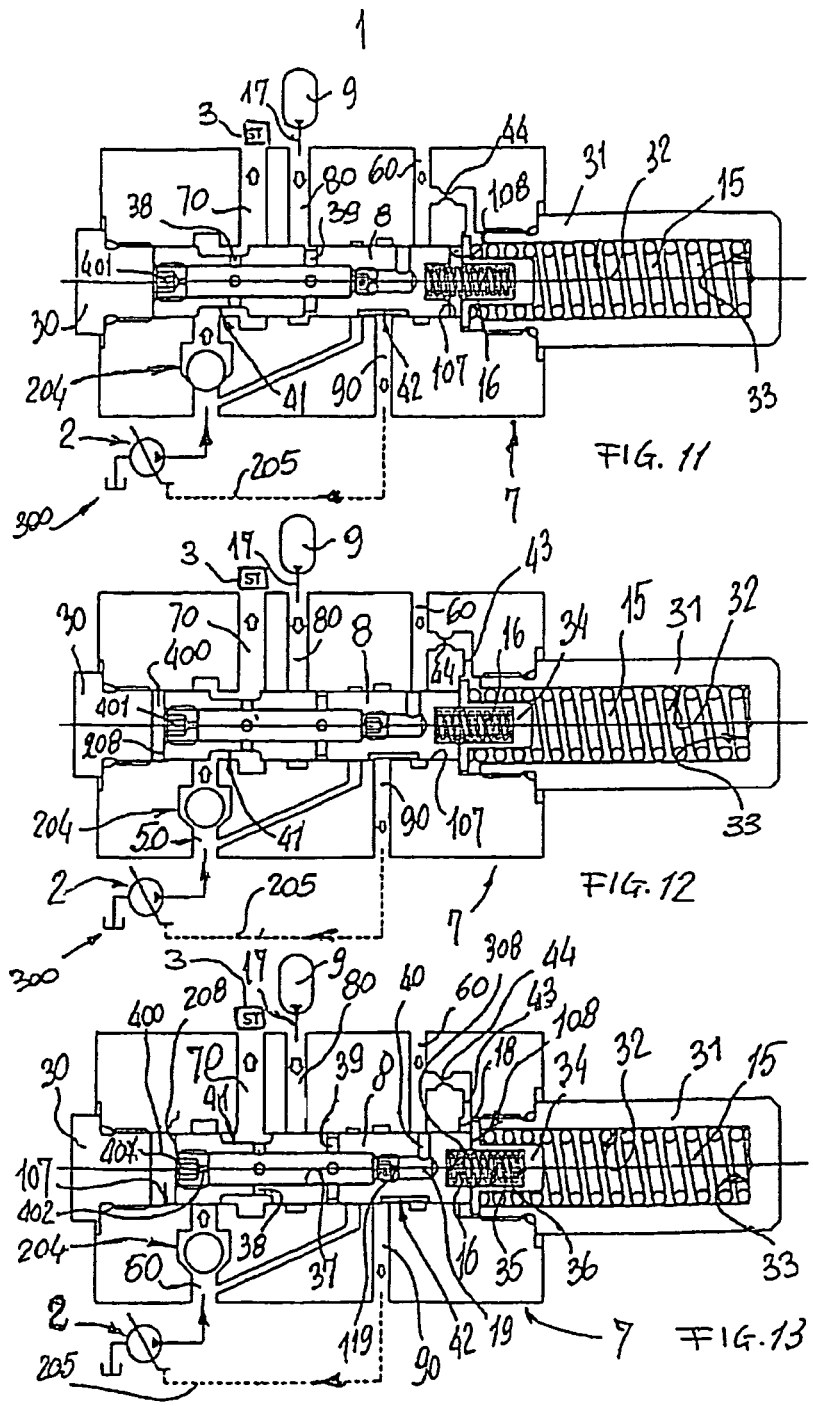

HYDRAULIC APPARATUS

CROSS REFERENCE TO RELATED APPLICATIONS

This application is the National Stage of PCT/IB2008/000576 filed on Mar. 13, 2008, which claims priority under 35 U.S.C. §119 of Italian Application No. MO2007A000097 filed on Mar. 20, 2007. The international application under PCT article 21(2) was published in English.

TECHNICAL FIELD

The invention relates to a hydraulic apparatus, suitable for distributing pressurised fluid in a hydraulic circuit of a work vehicle also under emergency conditions.

BACKGROUND ART

In work vehicles, used for working both on the fields and worksites, the laws that refer to safety require that such vehicles can be controlled even if the hydraulic units are damaged that take pressurised oil to the various driving and working apparatus on the vehicle.

To be able to keep the vehicle under control at all times, the pressurised oil, supplied by a pumping unit, is distributed by suitable hydraulic distributors that see to sending the correct quantities according to the specific operating requirements of the apparatus they are for and complying with certain sending priorities so as to be able to keep the vehicle's steering parts supplied at all times, even to the detriment of the other apparatus, so that control of the vehicles is guaranteed even under emergency conditions such as, e.g., a leak in the hydraulic circuit.

It is also necessary to underline the fact that the work vehicles have different weight and performance, i.e. in other words, they are classified in classes that are normally divided by vehicles of a lightweight class, vehicles of a medium weight class and vehicles of a heavy weight class.

The general standards that govern the construction of work vehicles require, as said above, that when a leak occurs in the hydraulic circuit that supplies the servo driving controls with pressurised oil as well as all the other working apparatus the vehicles are equipped with, it is still possible for the driver to steer for a certain length of time right after the leak occurs so the driver can drive the vehicle over to an area where it cannot generate a hazard due to the leak that has interrupted the supply of pressurized oil to the servo controls that operate the steering units, making the vehicle uncontrollable after a very short period of time.

In the case of vehicles belonging to the light weight class, the problem is felt less because, due to the relatively light weight of such vehicles, they can still be driven even under emergency conditions and without the action of servo mechanisms that are designed for this purpose and mounted on the vehicles even though the effort required of the driver is quite considerable.

In vehicles belonging to the medium weight class, hydraulic driving units are mounted that operate the steering parts of the vehicle and that are supplied with a dual displacement of oil from the pumping units: a higher displacement is supplied under normal operating conditions so steering is possible with only small turns of the steering wheel, a smaller displacement is supplied under emergency conditions to ensure the steering parts are supplied even if the steering wheel has to be turned a lot just for tiny steering manoeuvres.

In vehicles belonging to the heavy weight class, two pumping units are mounted in such a way that they are independent, one main unit and one auxiliary unit.

The main pumping unit is operated by the vehicle's engine and supplies the servo controls of the steering units and the working apparatus during normal operation of the vehicle, while the auxiliary pumping unit, which is connected to the transmission parts that transmit movement to the wheels from which it receives motion in order to be able to work, supplies small quantities of pressurised oil under emergency conditions so that, when there is a leak, the vehicle continues moving by inertia transmitting movement to the auxiliary pumping unit which, in turn, is able to supply a sufficient quantity of oil to allow a few steering manoeuvres before the vehicle stops once and for all.

This state of the art has some drawbacks.

A first drawback concerns the medium vehicle class: the dual displacement steering units are very expensive and influence the overall cost of the vehicles.

Besides this, under emergency conditions, these dual displacement steering units, while they do allow steering also under critical conditions they require, in order to do so, a lot of turning of the steering wheel with considerable physical effort by the driver.

In addition, these dual displacement pumping units are able to solve the problem of supplying with oil to the steering servo controls of vehicles in the medium class only, since their structure is such that it cannot operate the driving servo controls of vehicles in the heavy class under emergency conditions.

A second drawback appertaining to vehicles belonging to the heavy class is that the auxiliary pumping units are also very expensive and are an additional element that has to be mounted on the vehicles.

In addition, these secondary pumping units, as they are continuously operated by the movement of the wheels also when they are not required, continuously absorb a considerable amount of engine power which, however, in the greatest part of the vehicles' use cycle, is not used.

In addition to the above, if the pumping parts are set to supply several working apparatus mounted on the vehicle and they require different oil pressures, it could happen that the servo controls that operate the steering parts are sent oil at a pressure that is too high which could damage them: thus, it is necessary to mount an additional pressure compensating device that limits the pressure of the oil sent to the servo controls that operate the steering parts, e.g. by reducing the flow of oil.

OBJECTS OF THE INVENTION

One object of the invention is to improve the state of the art.

Another object of the invention is to provide a hydraulic apparatus that allows pressurised oil to be supplied to the servo controls that operate the vehicle's steering units under emergency conditions without, however, it being necessary to mount dual displacement pumping units, or the auxiliary type, coupled to the main pumping units.

According to one aspect of the invention a hydraulic apparatus is provided comprising: at least a pumping device for pumping a fluid at a first pressure; at least a user device of said fluid at said first pressure; at least an emergency supply device connectable to said user device activating a connection; at least an activation device of said connection that can be operated at a second pressure of said fluid different from said first pressure and interposed between said user device and said emergency supply means, wherein said activation device has an emergency configuration wherein both said pumping device and said emergency supply means device are connected to said user device a protection configuration where both said pumping device and said emergency supply device are substantially disconnected from said user device, and a normal operating configuration wherein said pumping device is connected with said user device and said emergency supply device is disconnected from said user device.

The hydraulic apparatus therefore allows, under emergency conditions, the user device to be supplied, such as the servo controls that activate the vehicle's steering units, in particular of work vehicles, with quantities of pressurized oil such to guarantee the possibility of continuing to drive the vehicles also under emergency conditions like, e.g., in the case of a leak in the hydraulic circuit which activates hydrostatic power steering and for a length of time that is enough to drive them in complete safety; at the same time, the hydraulic apparatus avoids that excessively pressurized oil reach the servo controls or that oil leaks occur; in fact, the oil, under emergency conditions, must be totally available for supplying the servo controls that operate the vehicle's steering units.

BRIEF DESCRIPTION OF THE DRAWINGS

Further characteristics and advantages of this invention will appear more evident from the detailed description of a hydraulic apparatus, illustrated for information purposes only and non limiting, in the enclosed drawing tables enclosed, wherein:

FIGS. 11, 12 and 13 are longitudinal sections of the activation device of the connections among a pumping device, a user device and an emergency supply device in a six port version in an emergency configuration, a normal operating configuration and in a protection configuration respectively;

EMBODIMENTS OF THE INVENTION

Figure 1:
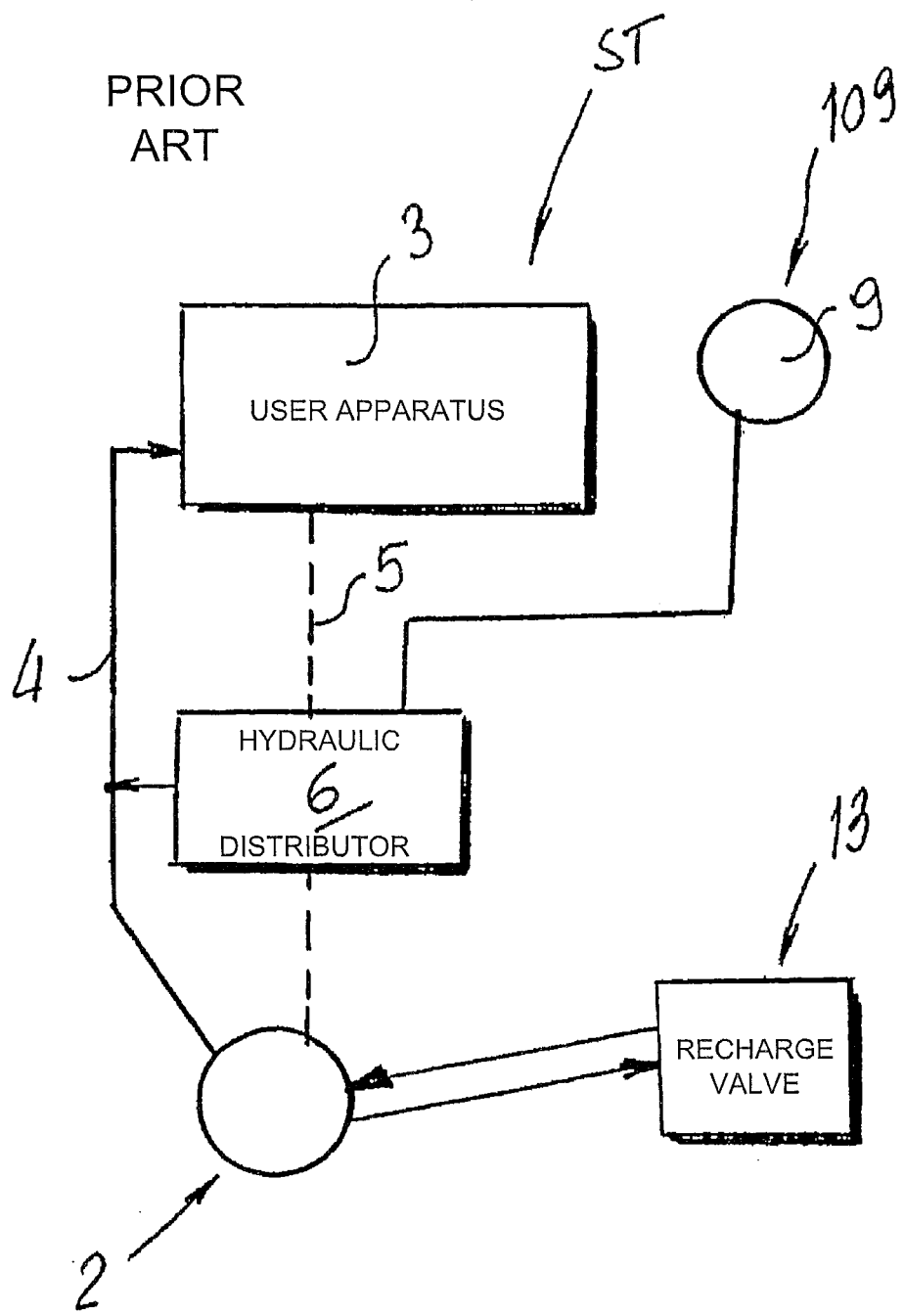
FIG. 1 is a block diagram of a hydraulic circuit that has one hydraulic distributor and a tank to hold pressurized oil usable in an emergency condition to supply a hydraulic apparatus like, e.g., the hydrostatic power steering of a vehicle.

With reference to FIG. 1, ST indicates a known hydraulic user apparatus, hereinafter referred to briefly as user apparatus ST like, e.g., the hydrostatic power steering 3 of a work vehicle, more specifically an agricultural tractor.

The user apparatus ST is supplied by a pump 2, designed to pump oil at a first pressure "P" towards the hydrostatic power steering 3.

The pump 2 is connected to the hydrostatic power steering 3 by means of a hydraulic circuit indicated in its totality with 4 in the Figures and between the hydrostatic power steering 3 and the pump 2 a line is contemplated for measuring pressures, known by the name of "load sensing line", in this case "load or pressure value" indicated with 5 and is able to transmit to the pump 2 pressure value variations which occur inside the hydrostatic power steering 3 when it is operated by the driver when he/she has to turn the steering wheel.

With reference to FIGS. 2 to 5, a hydraulic apparatus 1 is illustrated delimited by the dotted lines 1'.

According to the invention, it can be noted that between the hydrostatic power steering 3 and the pump 2 is interposed an activation device 6 of a connection between the hydrostatic power steering 3 and an emergency supply device, indicated as a whole with 109.

Figure 4:
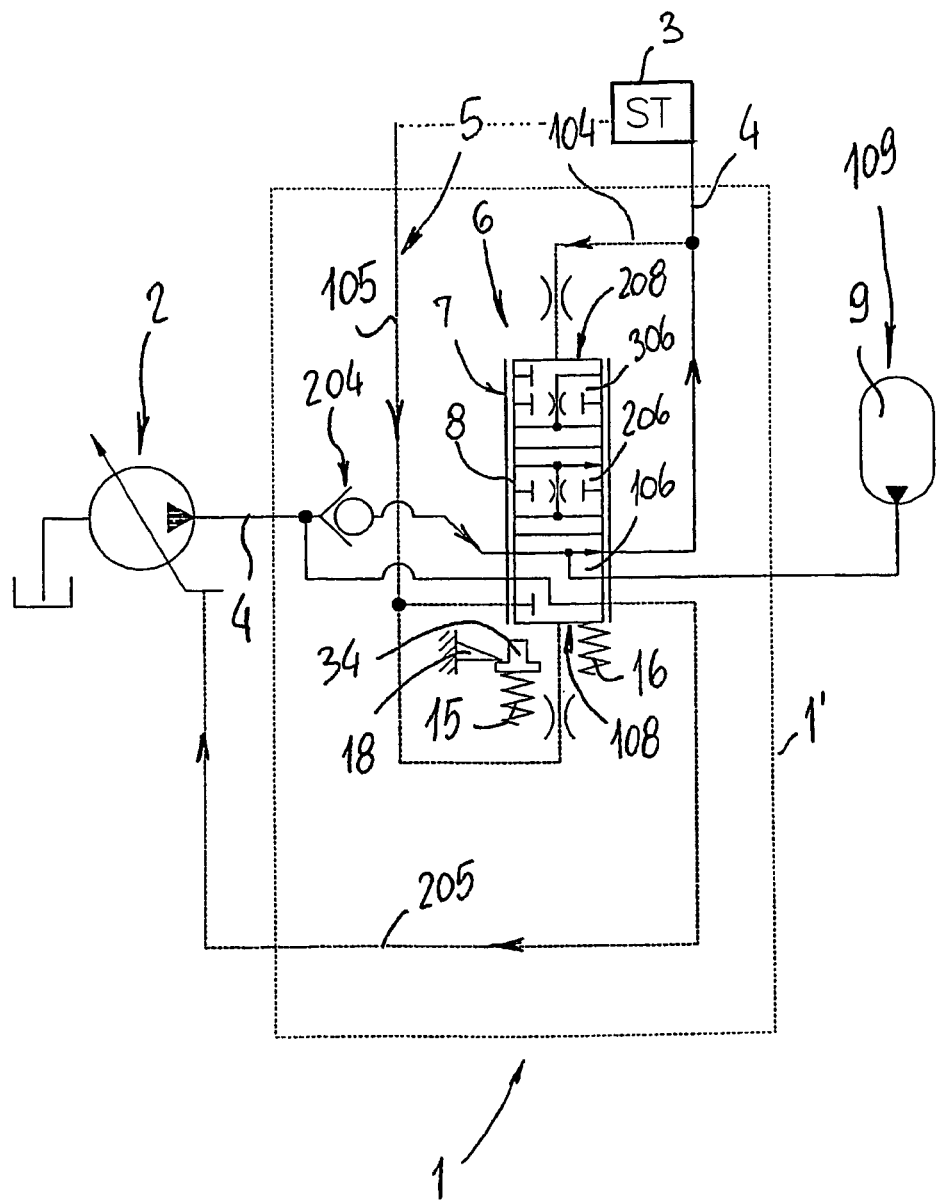
FIG. 4 is a diagram of a hydraulic circuit with the hydraulic apparatus of FIG. 1 in an emergency condition and where a supply line of pressurized oil to a user apparatus is controlled by the hydraulic distributor in a six port connection version.
Figure 5:
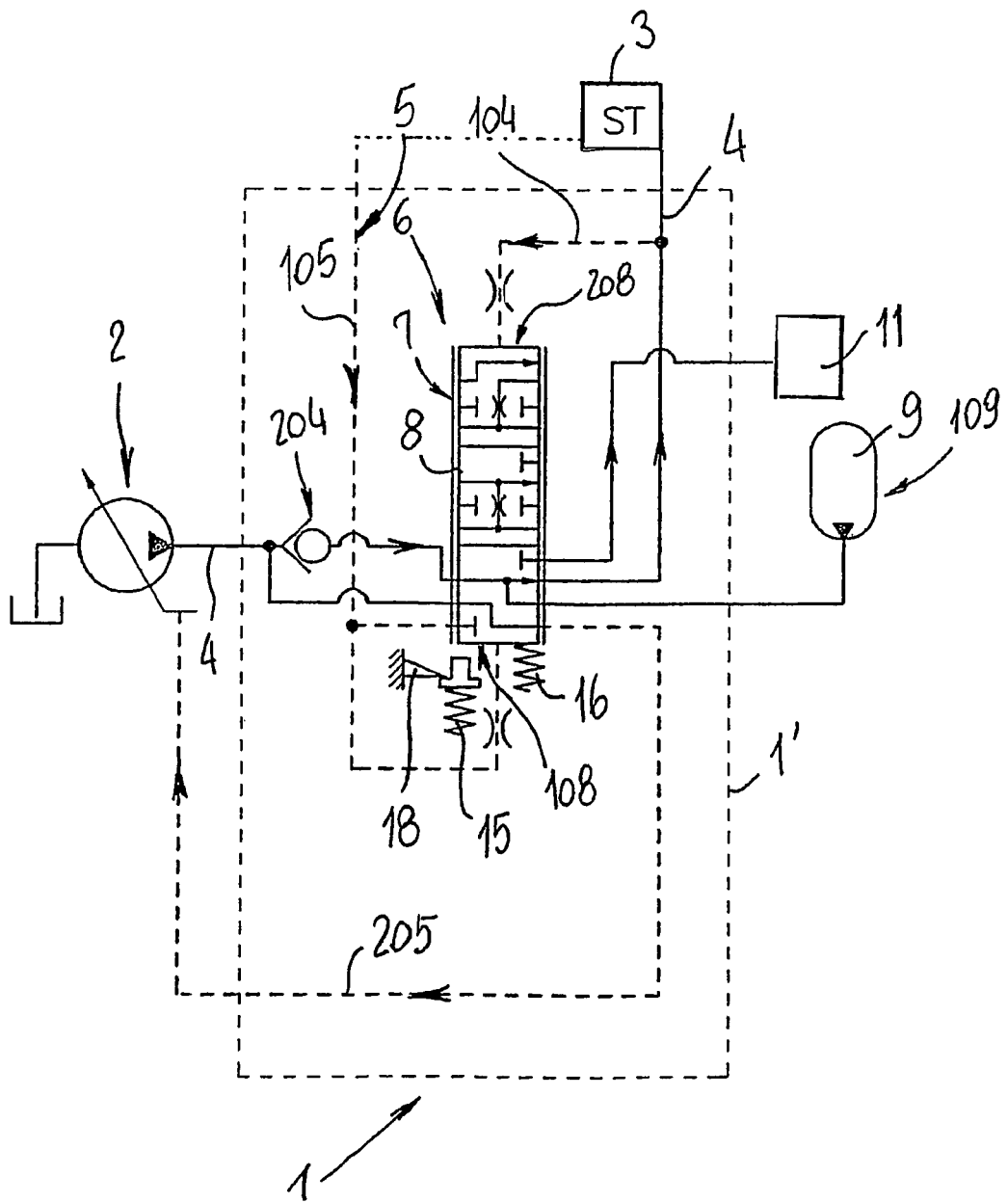
FIG. 5 is a diagram of a hydraulic circuit with the hydraulic apparatus of FIG. 1 in an emergency condition and where a supply line of pressurized oil to a user apparatus is controlled by the hydraulic distributor in a seven port connection version.
Figure 6:
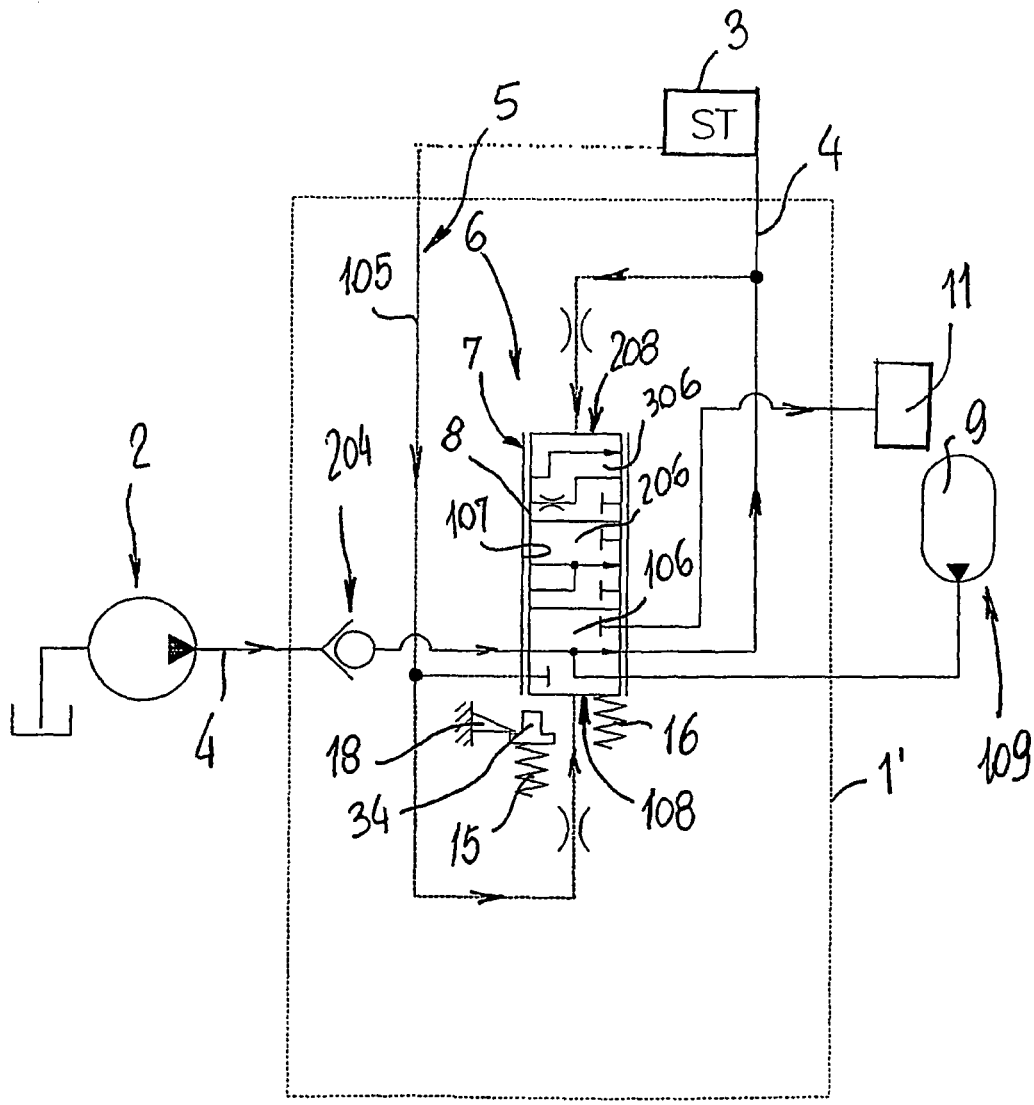
FIG. 6 is the hydraulic diagram of FIG. 2 to which a fifth port has been added for connecting to another user apparatus.
Figure 7:
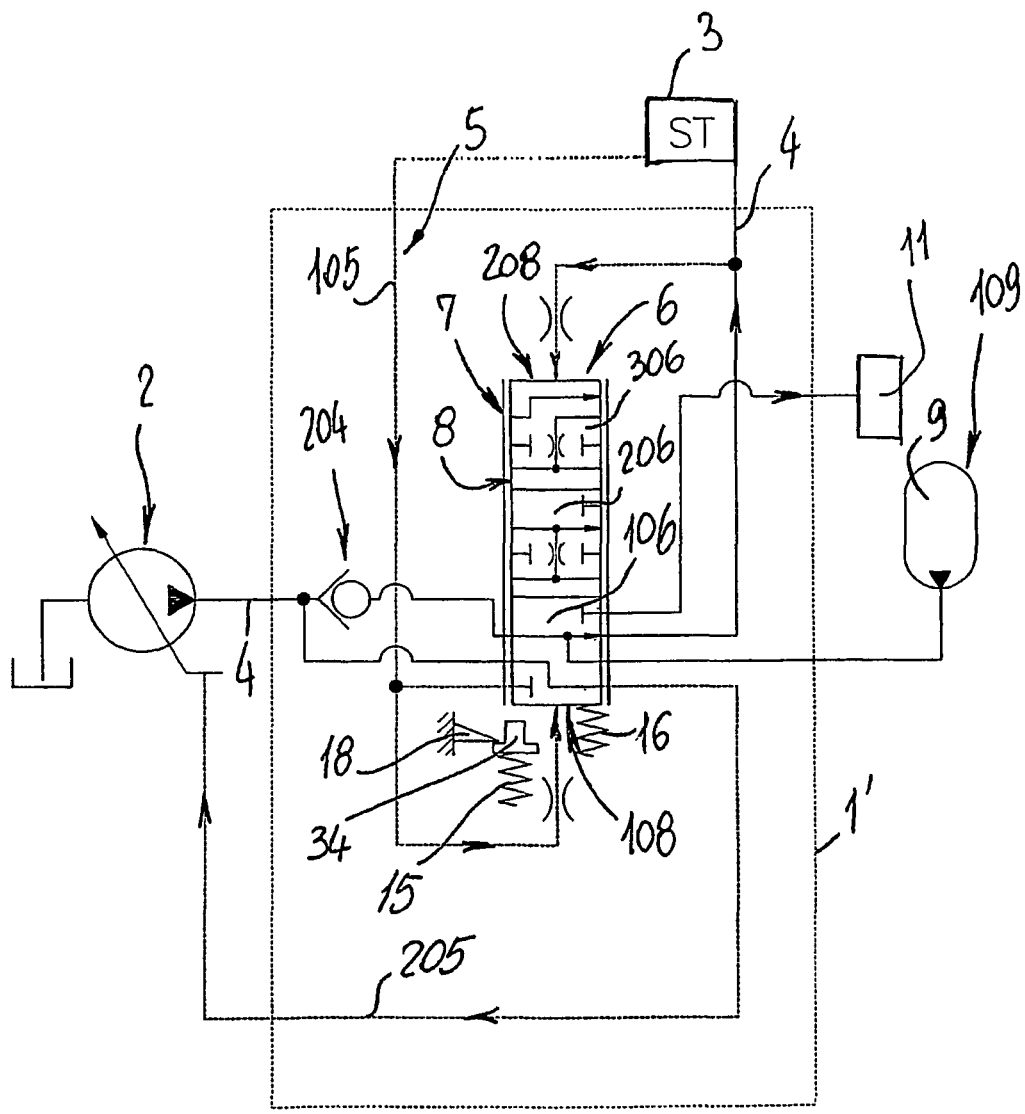
FIG. 7 is the hydraulic diagram of FIG. 4 to which a seventh port has been added for connecting to another user apparatus.
Figure 8:
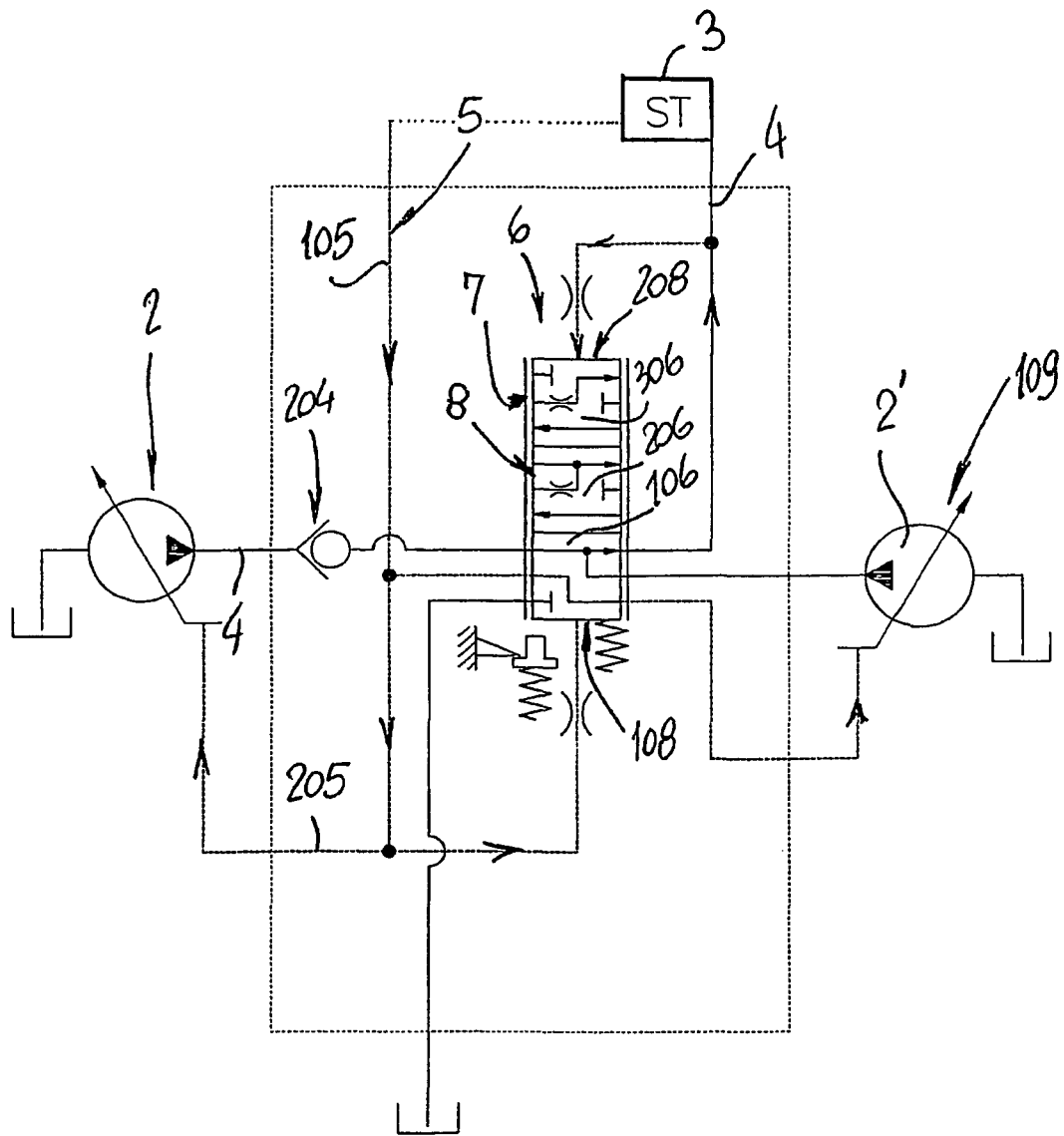
FIG. 8 is the hydraulic diagram of FIG. 4 in which a second version of the emergency supply device has been inserted.

The activation device 6 consists of a distributor device, of the type of a hydraulic distributor that comprises a sliding body, indicated in the diagrams of FIGS. 1-5 and in the sections of FIGS. 6-8 with the numerical reference 7, inside which a sliding seat 107 has been obtained; in this seat 107 a cursor 8 is arranged, that is mounted in a sliding way and ready to open and close, according to pre-established sequences, a set of ports obtained in the sliding body 107, designated to connect together, according to pre-established requirements, by means of the sliding of the cursor 8, the hydrostatic power steering 3, the pump 2, the "load sensing line" 5 and an the emergency supply device 109.

According to a first version of the hydraulic apparatus 1, this emergency supply device 109 comprises an accumulator 9 inside which pressurized oil is accumulated and which is rechargeable by the pump 2 as will be explained further on.

According to an alternative embodiment of the hydraulic apparatus 1, the accumulator 9 can be substituted by another pump, not illustrated in the drawings as it is known by the technicians in the sector, set to supply pressurised oil when the cursor 8 moves into the position contemplated for this and described further on.

The hydraulic distributor 6 has three distribution positions which are represented in the diagrams by three box sectors positioned one after the other: a first position is indicated by the sector 106, a second is indicated by the sector 206 and a third is indicated by the sector 306.

Figure 2:
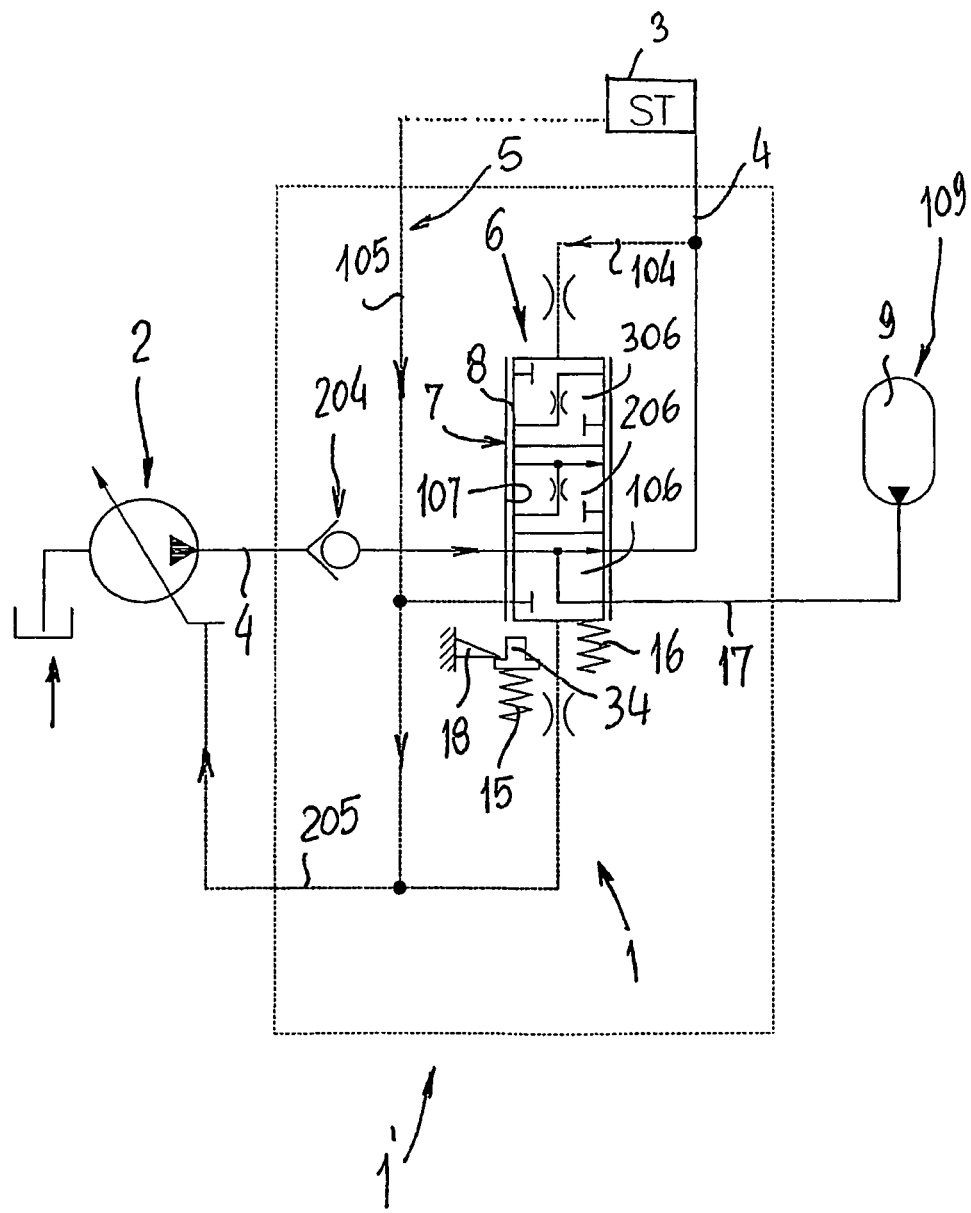
FIG. 2 is a diagram of a hydraulic circuit that comprises the hydraulic apparatus of FIG. 1 and in an emergency condition and where a supply line of pressurized oil to a user apparatus is controlled by the hydraulic distributor in a four port connection version.
Figure 3:
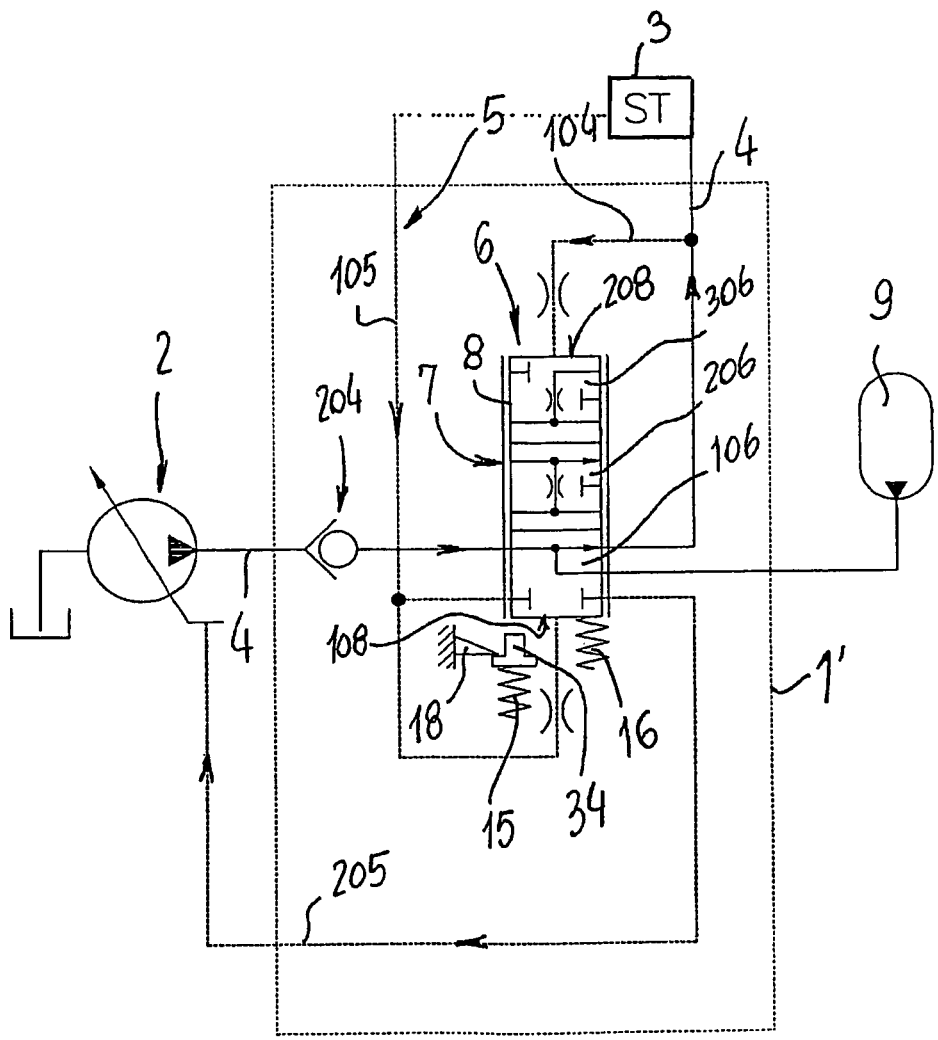
FIG. 3 is a diagram of a hydraulic circuit with the hydraulic apparatus of FIG. 1 in an emergency condition and where a supply line of pressurized oil to a user apparatus is controlled by the hydraulic distributor in a five port connection version.

The sliding body 7 of the distributor 6 can have, in accordance with different versions of possible embodiments, a predefined number of access ports to the sliding seat 107: this predefined number can vary from four ports, as in the version illustrated in FIG. 2, to five ports, as in the version illustrated in FIG. 3, to six ports, as in FIG. 4, to seven ports, as in the version illustrated in FIG. 5.

The functions of the various ports will be described in detail further on.

With reference to FIGS. 11, 12, 13, a first port is indicated with 50 that connects the pump 2 to the sliding seat 107; 60 indicates a second port that connects a first stretch 105 of the "load sensing" line 5 coming from the hydrostatic power steering to the sliding seat 107; 70 indicates a third port that connects the hydrostatic power steering 3 to the sliding seat 107; 80 indicates a fourth port that puts the accumulator 9 in communication with the sliding seat 107 for the supply; 90 indicates a fifth port that puts in communication a second stretch 205 of the "load sensing" line 5 that takes a pressure signal or a modification signal of the pressure values from the sliding seat 107 to the pump 2.

The sliding seat 107 has one end facing left for those looking at the FIGS. 11 to 13, which is closed with a cap 30 thus defining a chamber 400 between the cap 30 and a first end 208 of the cursor 8, while, the second opposite end, facing right for those looking at FIGS. 11 to 13, is closed with a tang 31 screwed into it and inside which a second hollow seat 32 is formed axially which houses a first spring 15, that can be loaded by compression.

The latter has one end that rests on a closed bottom 33 of the tang 31, while the opposite end rests on a spring-guide body 34 which is made so it can rest alternatively against the second end 108 of the cursor 8 or against a shoulder or stroke stop 18, obtained in the sliding seat 107.

The spring-guide body 34 has inside a third hollow seat 35 in which a second spring 16 is housed, which is contained at one end by a closed bottom 36 of the third hollow seat 35 while the other opposite end by a slot 308 made in the second end 108 of the cursor 8.

This cursor 8 is crossed by an axial pipe 37 from which, in a transversal and substantially perpendicular direction, proceeding in the direction from the cap 30 towards the tang 31, first radial openings 38, second radial openings 39 and a third radial opening 40.

In addition, peripherally the cursor 8 has a first annular groove 41 and a second annular groove 42 and, at the end facing the cap 30, a passage 401 that connects the pipe 37 to the chamber 400 by the interposition of a constriction 402.

The height of the first annular groove 41 is such that, when required, it is possible to connect together the first port 50, through which pressurized oil is sent from the pump 2, and the fourth port 80 connected to the hydrostatic power steering 3, as can be seen in FIG. 11 and in FIG. 12.

The height of the second annular groove 42 is such that, when required, it is possible to connect together the second port 60 and the fifth port 90 from where the second stretch 205 of the "load sensing" line 5 comes out.

Thus, in the position of the cursor 8 illustrated in FIG. 12, the latter is kept balanced between the thrust of the oil pressure in the chamber 400, which acts on the thrust surface of the first end 208 of the cursor 8, and the counter-thrust of the springs 15 and 16, which act together with that of the oil of the "load sensing" line coming from, via the first stretch 105 of the latter, the hydrostatic power steering 3 through the second port 60 and going towards the fifth port 90.

In this second position 206 of the cursor 8, that corresponds to a normal operating configuration of the hydraulic distributor 6, it can be seen that the pump 2 supplies the hydrostatic power steering 3 by thrusting pressurized oil, precisely at a first pressure "P", through the first port 50, the first annular groove 41, from where the oil goes through the first radial openings 38 and from these, through the axial pipe 37, to the third port 70 and, from here, to the hydrostatic power steering 3.

It can also be seen that in this position of the cursor 8, the fourth port 80 is completely closed by the cursor 8 while the second port 60, which is constantly in communication with the second hollow seat 32 by means of a derived pipe 43, normally controlled by a constriction 44, is partially connected both to the fifth port 90, by means of the second annular groove 42, and to the hydrostatic power steering 3 by means of the third radial opening 40 and the axial pipe 37.

In the first position 106 of the cursor 8, equivalent to an emergency configuration of the hydraulic distributor 6 and schematically indicated in FIG. 4 and in the corresponding longitudinal section of FIG. 11, it can be seen that the cursor 8 has the sector 106 aligned with the pump 2 which is still connected to the hydrostatic power steering 3 by means of the hydraulic circuit 4.

Together with this, it can be seen that the accumulator 9 is also connected to the hydrostatic power steering 3 by means of the second radial openings 39, the axial pipe 37 and the first radial openings 38; in this way, even if the hydraulic circuit 4 is damaged and leaks oil, a sufficient volume of pressurised oil coming from the accumulator 9 can still reach and operate the hydrostatic power steering 3, albeit for a limited number of operations.

The pressure of the oil in the hydraulic circuit 4 becomes, in this emergency condition, very low due to the leak and, therefore, the pressure "P" inside the chamber 400 and which acts through the branch 104 on the corresponding transversal thrust surface of the first end 208 of the cursor 8, is very limited; for this reason, the pressure "P1" which acts on the transversal thrust surface of the opposite end 108 and, above all, the thrust of the second spring 16, are sufficient to keep the cursor 8 in this emergency position 106, while the first spring 15 remains inactive, being blocked by the shoulder or stroke stop 18 designed for this purpose in the sliding body 7. With reference to FIG. 11 where the emergency condition is illustrated schematically in FIG. 4, it can be seen that the position of the cursor 8 is such to keep the connection open between the pump 2 and hydrostatic power steering 3, by means of the hydraulic circuit 4, the first port 50, the first annular groove 41, the axial pipe 37, the first radial openings 38 and the third port 70.

However, the fast drop in pressure inside the chamber 400, which is transmitted to it through the first port 50, the first radial openings 38 and the axial pipe 37, and the consequent progressive movement of the cursor 8 until it comes to rest against the cap 30, opens the connection also between the second radial openings 39 and the fourth port 80, putting in communication the accumulator 9 with the hydrostatic power steering 3 through the axial pipe 37.

In this emergency condition, therefore, some of the oil sent by the pump 2 but, above all the oil contained in the accumulator 9, reaches the hydrostatic power steering 3 which allows the driver to operate the hydrostatic power steering 3, albeit for only a few operations, but which is enough to drive the agricultural tractor over to a safe area like, e.g., a parking area.

In this emergency configuration, the first spring 15 is inactive with respect to the second end 208 because the cursor 8 is completely over against the cap 30 and the spring-guide body 34, as can be seen in FIG. 4 and also in FIG. 11, is resting against the shoulder or stroke stop 18 obtained in the sliding seat 107.

A protection configuration of the hydraulic distributor 6 illustrated in FIG. 13 again in the longitudinal section, is reached when, starting from the normal operating position illustrated in FIG. 12, the pump 2 starts supplying oil at a pressure "P2" that is greater than the normal operating pressure "P" and that the hydrostatic power steering 3 is able to withstand: this condition occurs when, e.g., a working device on the agricultural tractor has to be operated and which must be supplied with oil at operating pressure "P2" and that the pump 2 starts supplying as soon as this working device is operated.

With reference to FIG. 13 which illustrates this protection condition, it can be seen that the cursor 8 is already in the third position indicated by the sector 306 in FIGS. 2-5; in this position, both the first port 50, and consequently the hydraulic circuit 4, and the fourth port 80, and consequently another hydraulic circuit 17 that connects the accumulator 9 to the sliding seat 107, are interrupted by the cursor 8 and, therefore, oil at pressure "P2" cannot reach the hydrostatic power steering 3 while the oil that is in the hydraulic circuit 4 is drained slowly towards a discharge 300 through a connecting section 19 that is an extension of the axial pipe 37 to reach the third radial opening 40.

Figure 9:
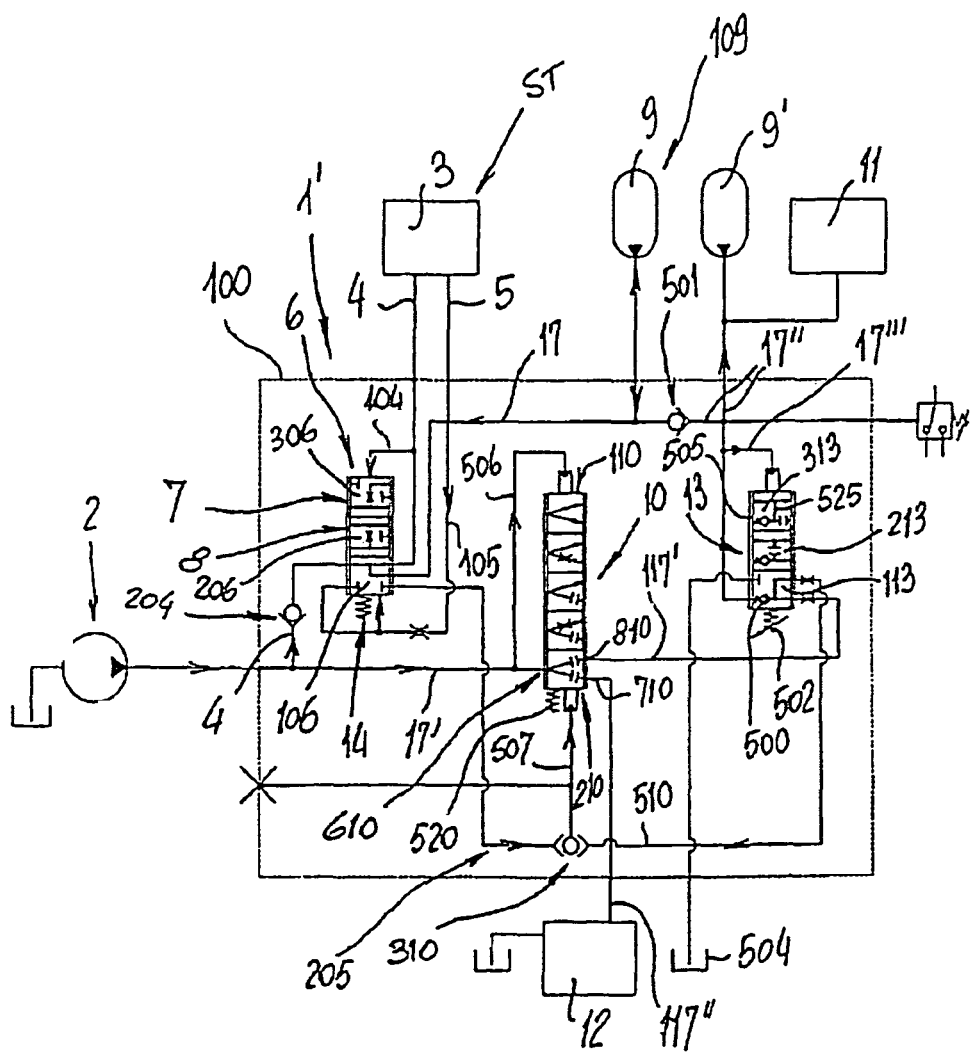
FIG. 9 is a hydraulic diagram of the hydraulic apparatus of FIG. 3, comprising another part for supplying other user apparatus according to defined priorities and a part for recharging emergency supply device.
Figure 10:
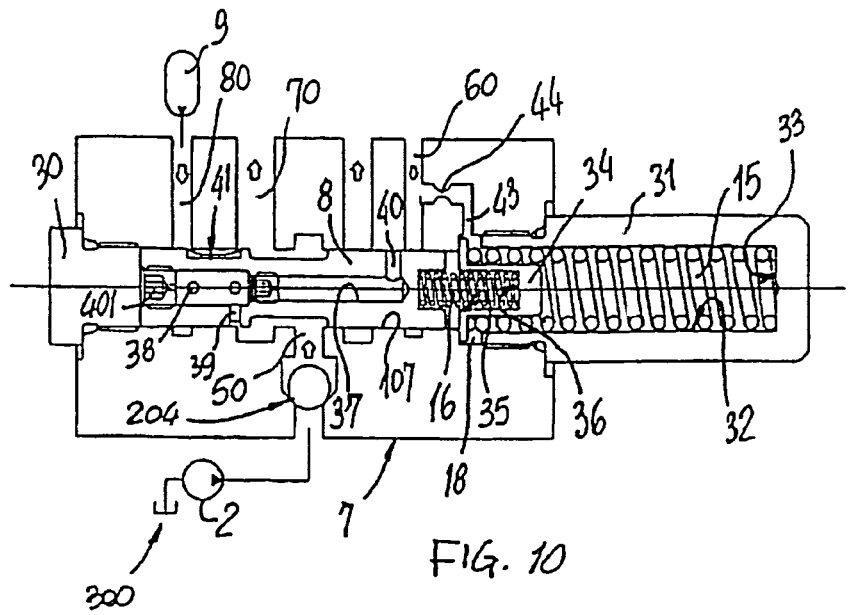
FIG. 10 is a longitudinal section view of the activation means of connections among a pumping device, a user device and an emergency supply device, in a five port version and in an emergency condition.
Figure 14:
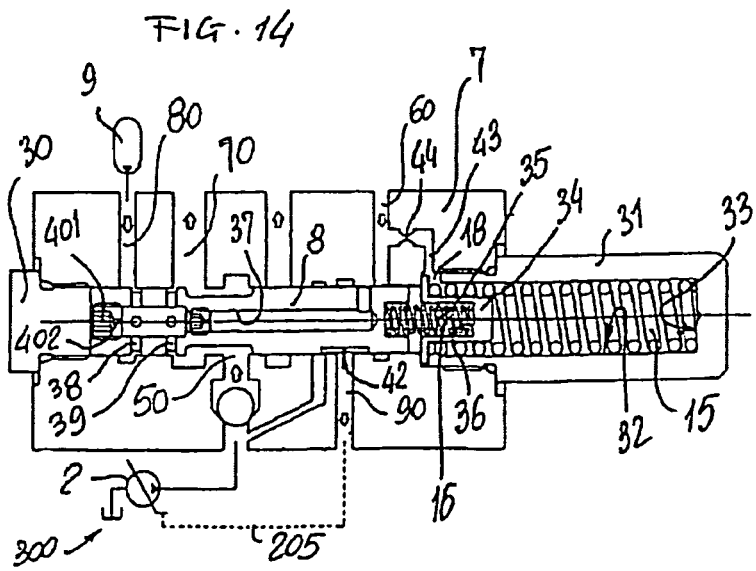
FIG. 14 is a longitudinal section view of the activation device of connections among a pumping device, user means and an emergency supply device, in a seven port version and in an emergency condition.

The movement of the cursor 8 into the protection position of the hydrostatic power steering 3 occurs because the oil at pressure "P2", which is supplied by the pump 2 when a working device of the agricultural tractor is operated and indicated with 11 or 12 in FIG. 9, instantly invades the chamber 400 seeing as the cursor 8 is in the normal operating condition illustrated in FIG. 12.

The thrust that this pressure "P2" generates almost instantly on the transversal thrust surface of the end 208 of the cursor 8 is greater than the opposing thrust generated globally by the action of the pressure "P1", which reaches inside the second hollow seat 32 coming from the first stretch 105 of the "load sensing" line 5, through the second port 60 and the branch 104, and that of the springs 15 and 16 which act on the same second end 108.

When the cursor 8 moves into the third position illustrated in FIG. 13, it can be seen that both the first spring 15 and the second spring 16 are compressed in an axial direction, between, respectively, the slot 308 and the closed bottom 36 of the spring-guide 34 and between this and the closed bottom 33 of the tang 31.

With reference to FIG. 9 it can be seen that the hydraulic apparatus is completely contained inside the dotted line 100.

The hydraulic apparatus, indicated in this case with reference number 1', also comprises further priority hydraulic distributor designed to supply pressurised oil—according to a pre-established sequence—not only to the hydrostatic power steering 3 but also to the two additional devices 11 and 12, comprising, e.g., a braking unit and a lifting device mounted on the agricultural tractor.

In the hydraulic apparatus 1' a recharge valve 13 is also designed to recharge the accumulator 9 in certain conditions.

The pump 2, therefore, sends pressurised oil both towards the hydraulic distributor 6 through the hydraulic circuit 4 and towards the further hydraulic distributor 10 through a supply branch 17', from which a derivation branch 506 starts, reaching a first end 110 of the further hydraulic distributor 10.

On an opposite end 210 of the further distributor 10 an additional hydraulic branch 507 acts which is supplied as will be described further on.

This further distributor 10 has numerous distribution positions and has one inlet port 610 and two outlet ports, 710 and 810 respectively, which are connected to the additional device 12, by means of a branch 117", and to the recharge valve 13 with a branch 117'.

The operation of the further priority hydraulic distributor 10 is known and inconsequential for this invention and so is not described in any further detail.

It should however be noted that on the transversal pressure surface of the opposite end 210, an oil pressure value acts that reaches it through the additional hydraulic branch 507: this pressure value is the greatest of the pressure values selected out of the two that reach a valve 310 in which the second stretch 205 of the "load sensing" line 5 and one branch of the circuit 510 derived from the supply branch 117' are channeled, immediately upstream from a uni-directional valve 500 mounted inside the recharge valve 13 as described further on.

Basically, the further distributor 10 is moved by differences between pressure values acting on the opposite ends 110 and 210. The recharge valve 13 has three working positions, indicated by sectors 113, 213 and 313 respectively or, briefly, by position 113, 213 and 313.

In position 113 which is the position in which the accumulator 9 is recharged and which, therefore, is a recharging position, the supply branch 117', which comes from the further priority hydraulic distributor 10 coming out of the port 810 and which is controlled by the latter, is connected to the accumulator 9 by means of a connecting branch 17" and, hence, is connected also to an additional accumulator 9' which is associated to the additional device 11.

In this position 113, on the supply branch 17', one uni-directional valve 500 is mounted, as mentioned previously, which has the function of preventing the oil returning to the pump 2; also on one outlet branch from the recharge valve 13 and indicated with 17", a uni-directional valve 501 is mounted which, in turn, has the function of preventing the pressurised oil in the accumulator 9 from returning to the recharge valve 13.

The latter comprises, as is known, a valve body inside which a distributor body 505 is mounted in a sliding manner which moves between the three working positions 113, 213 and 313.

The movement of this distributor body 505 occurs due to the pressure stresses that act on its opposite ends, with pressure forces generated respectively by a counter spring 502, which has an adjustable force, and by the oil that acts on the opposite end through one circuit branch 17''' derived from the outlet branch 17".

In position 113 illustrated in FIG. 9, it can be seen that the pump 2 is connected to the accumulators 9 and 9': hence, in this position, the latter are recharged.

When recharging is completed, the pressure inside the outlet branch 17" and the circuit branch 17''' increases causing the cursor 505 to move up to position 313 where the supply of pressurised oil is interrupted.

When the value of the oil pressure inside the outlet branch 17", and hence 17''', exceeds a preset loading value of the counter spring 502, the distributor body 505 moves into the position 213.

In this position the pump 2 is still connected to the accumulator 9, while the circuit branch 510 is connected to a discharge 504: because of this, at the valve 310 arrives only the pressure value of the pump 2 which, together with an auxiliary spring 520, presses on the end 210 pushing the priority hydraulic distributor 10 gradually towards a closing configuration of both outlet ports 710 and 810, hence reducing, until it stops, the supply of oil at pressure "P" to the accumulators 9 and 9': this position 213 defines a condition considered as standby.

If the pressure inside the additional circuit 17', and consequently inside the outlet branch 17", continues to increase, e.g., because an increase in the flow rate is required of the pump 2 in order to activate the additional device 12 and the priority hydraulic distributor 10 has moved into a supply configuration of this additional device 12, this pressure also acts on the distributor body 505, via the branch 17''', moving it into position 313 and winning against the resistance of the counter spring 502.

As can be seen, in this position 306 the passage line 117' is closed and the branch 510 is connected to the discharge 504; the outlet branch 17" is also connected to the discharge 504, by means of a connection 525 in the distributor body 503 and which connects together, in position 313, the passage line 117' and the outlet branch 17": this position 313 is, therefore, a position that protects the accumulator 9 against excessive over pressures in input that exceed the pressure value the accumulator 9 can tolerate.

Hence, in this position 306, the pump 2, due to the cursor 505 moving into position 313, and the accumulator 9, due to the cursor 8 moving into position 306, cannot send any more oil at pressure "P2" generated by the pump 2 to operate the additional device 12 towards the hydrostatic power steering 3, which is thus protected against damage.

The oil at pressure "P2" is then drained slowly from the chamber 400 through the pipe 37, the connecting section 19 controlled by a constriction 119, the third radial opening 40 and the second annular groove 42 that opens the connection between the latter and the additional opening 90, from where the second stretch 205 of the "load-sensing" line 5 starts that carries the drained oil back to the pump 2, until inside the chamber 400 is restored the pressure value "P" at which the hydrostatic power steering 3 can work.

When this condition is reached, the cursor 8 moves again in the direction of the cap 30, until it is once again in the normal operating condition indicated in FIG. 12.

The invention claimed is:

1. Hydraulic apparatus comprising:
at least a pumping device for pumping a fluid at a first pressure;
at least a user device of said fluid at said first pressure;
where said user device is of the type of a hydrostatic power steering;
and a line between said hydrostatic power steering and said pumping device;
said line is for measuring pressures and for transmitting to the pumping device pressure value variations which occur inside the hydrostatic power steering when said hydrostatic power steering is operated by a driver when said driver has to turn a steering wheel;
at least an emergency supply device connectable to said user device activating a connection by movement of a cursor element of a distributor device in a sliding seat;
at least an activation device of said connection that can be operated at a second pressure of said fluid different from said first pressure and said activation device is interposed between said user device and said emergency supply device, and between said pumping device and said emergency supply device;
wherein said activation device comprises at least said distributor device for distributing said fluid, wherein said distributor device comprises the cursor element defining two opposite ends and sliding into a distributor body having a plurality of distribution ports, said cursor element being activated sliding by pressure values of said fluid acting on said opposite ends, and wherein said distributor body defines inside the sliding seat and said plurality of ports cross said distributor body, in such a way to put said sliding seat in communication with the outside of said distributor body, said cursor element adjusting by means of sliding in said sliding seat, openings and closings of said plurality of ports;
and wherein said activation device has an emergency configuration wherein both said pumping device and said emergency supply device are connected to said user device,
a protection configuration where both said pumping device and said emergency supply device are disconnected from said user device,
and a normal operating configuration wherein said pumping device is connected with said user device and said emergency supply device is disconnected from said user device;
wherein the emergency supply device comprises at least one accumulator unit for the pressurized fluid, and wherein the sliding seat has an end closed with at least a cap and an opposite end by which is applied at least an elastic counter arrangement to counteract the sliding of said cursor element, wherein the elastic arrangement comprises at least two springs that can be preloaded at pressure values that are different from one another, comprising a first spring and a second spring, wherein in the emergency configuration the first spring is inactive with respect to the opposite end and wherein in the protection configuration both of the springs are compressed in an axial direction.

2. Hydraulic apparatus according to claim 1, wherein between said distributor device and said user device is interposed at least a sensing arrangement of said first pressure of said fluid and of at least a second pressure different from said first pressure, said sensing arrangement controlling said activation device so that said emergency supply device is connected with said user device when said sensing arrangement read said at least second pressure.

3. Hydraulic apparatus according to claim 2, wherein said plurality of ports comprises at least four ports, a first port being connectable with said pumping device, a second port being connectable with said sensing arrangement, a third port being connectable with said user device, a fourth port being connectable with said emergency supply device.

4. Hydraulic apparatus according to claim 2, wherein said plurality of ports comprises at least five ports, a first port being connectable with said pumping device, a second port being connectable with said sensing arrangement, a third port being connectable with said user device, a fourth port being connectable with said emergency supply device, a fifth port being connectable with a further sensing line placed in between said distributor device and said pumping device.

5. Hydraulic apparatus according to claim 2, wherein said plurality of ports comprises at least five ports, a first port being connectable with said pumping device, a second port being connectable with said sensing arrangement, a third port being connectable with said user device, a fourth port being connectable with said emergency supply device, a fifth port being connectable with further user device.

6. Hydraulic apparatus according to claim 1, wherein said user device comprises a steering unit of a vehicle.

7. Apparatus according to claim 1, wherein said distributor device can be positioned in said emergency configuration when said pumping device are inactive and/or inefficient and/or insufficient.

8. Hydraulic apparatus comprising:
- at least a pumping device for pumping a fluid at a first pressure;
- at least a user device of said fluid at said first pressure;
- between said user device and said pumping device a line is contemplated for measuring pressures and for transmitting to the pumping device pressure value variations which occur inside the user device when it is operated by the driver when said driver has to turn a steering wheel;
- at least an emergency supply device connectable to said user device activating a connection by movement of a cursor element of a distributor device in a sliding seat;
- at least an activation device of said connection that can be operated at a second pressure of said fluid different from said first pressure and said activation device is interposed between said user device and said emergency supply device, and between said pumping device and said emergency supply device;
- wherein said activation device comprises at least said distributor device for distributing said fluid, wherein said distributor device comprises the cursor element defining two opposite ends and sliding into a distributor body having a plurality of distribution ports, said cursor element being activated sliding by pressure values of said fluid acting on said opposite ends, and wherein said distributor body defines inside the sliding seat and said plurality of ports cross said distributor body, in such a way to put said sliding seat in communication with the outside of said distributor body, said cursor element adjusting by means of sliding in said sliding seat, openings and closings of said plurality of ports;
- and wherein said activation device has an emergency configuration wherein both said pumping device and said emergency supply device are connected to said user device,
- a protection configuration where both said pumping device and said emergency supply device are disconnected from said user device,
- and a normal operating configuration wherein said pumping device is connected with said user device and said emergency supply device is disconnected from said user device; wherein the emergency supply device comprises at least one accumulator unit for the pressurized fluid, and wherein the sliding seat has an end closed with at least a cap and an opposite end by which is applied at least an elastic counter arrangement to counteract the sliding of said cursor element, wherein the elastic arrangement comprises at least two springs that can be preloaded at pressure values that are different from one another, comprising a first spring and a second spring, wherein in the emergency configuration the first spring is inactive with respect to the opposite end and wherein in the protection configuration both of the springs are compressed in an axial direction.

9. Apparatus according to claim 8, wherein said emergency supply device is rechargeable with a recharging arrangement, wherein said recharging arrangement comprise at least a valve fitted between said emergency supply device and said pumping device and intended for opening or closing a connection between the latter and wherein said valve comprises a further hydraulic distributor having an inner cursor intended for positioning itself in at least two operating positions, in a first position said pumping device being connected with said emergency supply device, in a second position said pumping device being disconnected from said emergency supply device.

\* \* \* \* \*